(No Model.)
F. W. MINCK.
Weighing Attachment for Freight Cars.
No. 243,150. Patented June 21, 1881.
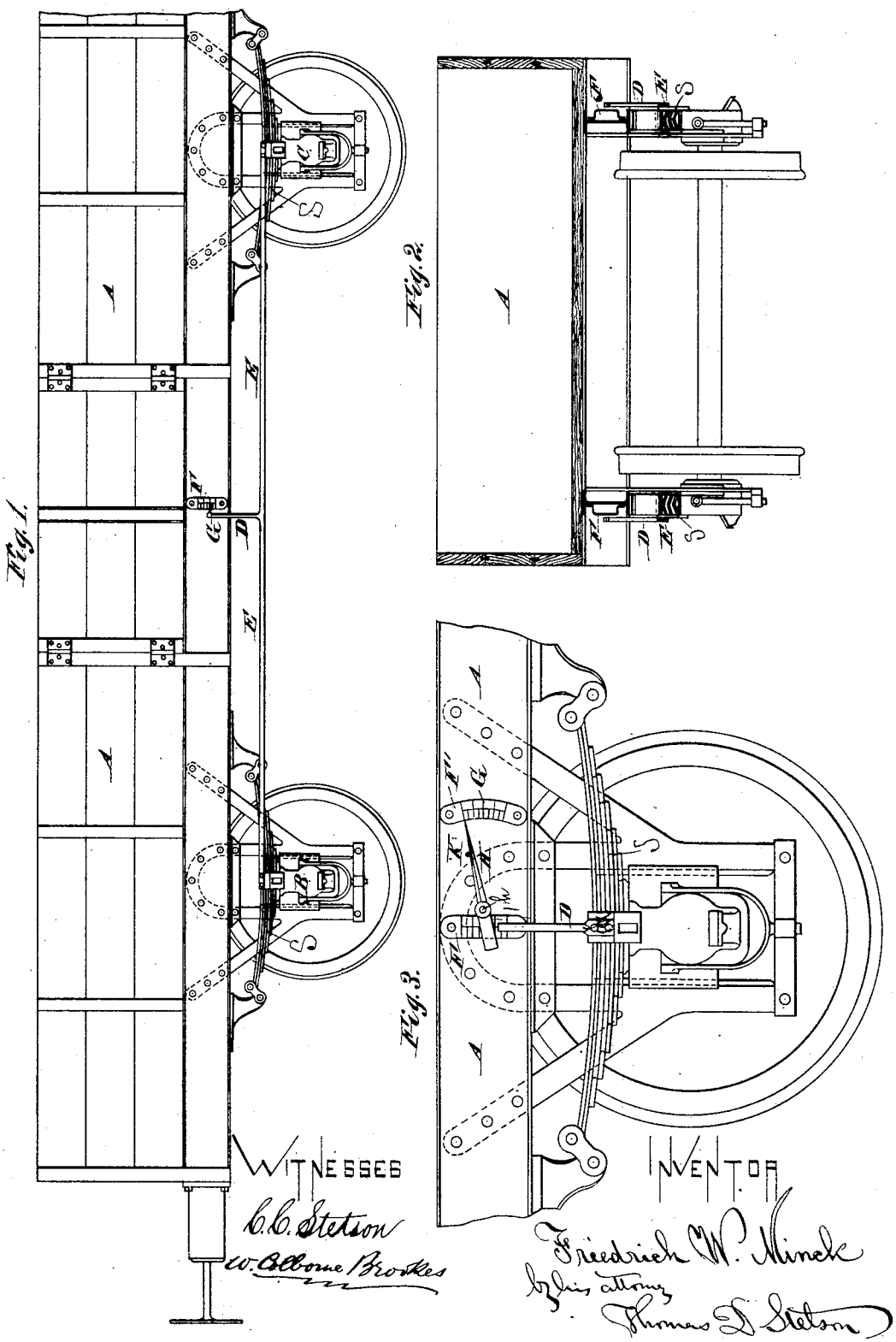

UNITED STATES PATENT OFFICE.

FRIEDRICH W. MINCK, OF LISKOWITZ, AUSTRIA, ASSIGNOR TO HIMSELF AND MATTHIAS QUENSTEDT, OF BERLIN, GERMANY.

WEIGHING ATTACHMENT FOR FREIGHT-CARS.

SPECIFICATION forming part of Letters Patent No. 243,150, dated June 21, 1881.

Application filed December 1, 1880. (No model.)

*To all whom it may concern:*

Be it known that I, FRIEDRICH WILHELM MINCK, of Liskowitz, in the Empire of Austria, have invented certain new and useful Improvements in Weighing Devices for Railroad Freight-Cars, of which the following is a specification.

The invention relates to that class of weighing devices which are placed on cars, which enables an accurate weight to be taken without placing the car on a weighing-platform, or arriving at the weight of the car and its contents by simply knowing its capacity.

The invention will be understood as set forth in the following specification and claims.

The accompanying drawings form a part of this specification and illustrate the invention as applied.

Figure 1 is a side elevation of a freight-car with the weighing device applied and the weight indicated on a scale at the center of the car. Fig. 2 is a vertical cross-section of the car. Fig. 3 is a form of the device in which the weight is indicated directly above the axle.

Similar reference-letters indicate corresponding parts in all the figures.

A is the car-body, which, with its contents, it is intended to weigh.

B C are the axle-boxes, to which, in Figs. 1 and 2, are attached the ends of the rod E, which extends from front to rear axle, and which, at mid-length, bears the pointer D, back of which, on the body of the car, is placed the scale F. This scale F bears essentially the mark G, which indicates the general capacity of the car. It may also bear other marks to show other weights.

S S are the springs under the car-body, which yield to the weight of the body and contents, and as they are pressed down the body and scale F will move down behind the pointer D, and thus the weight will be indicated. The rod E and pointer D are rigid and immovable, and the different weights are denoted by the different levels of the scale attached to the car-body. The weight is by means of the rod E and pointer D, with the scale, indicated at the most prominent portion of the car.

In cases where delicate weighing is required the device described is equipped with a pivoted pointer or index in addition to the rigid one above described. This pivoted index moves over a scale marked to indicate slight variations in weight. The scale behind the rigid index will still indicate the approximate weight, while this pivoted index shows the fractions and neater weights. For convenience of illustration the pivoted index, as shown in Fig. 3, is placed in connection with a rigid index which rises directly from the axle-box. This form is not, however, preferred, as it takes four separate scales, one over each wheel, to make the device efficient, while with the long rod but two are required. The pivoted lever and second scale are used with either form. In this figure the pointer D is attached directly to the axle-box, and the scale F on the car-body is moved behind it. An additional pointer, H, pivoted at $h$, moves over the enlarged scale F', a stop, K, limiting its movement upward. It is operated upon back of the pivot $h$ by the pointer D, to which it may be attached by means of a link. (Not shown.) This arrangement will indicate more delicate weights than that shown in Figs. 1 and 2.

I prefer to place the weighing device on both sides of the car for convenience in use.

Having thus described my invention, what I claim is—

1. The combination of the rigid rod E, extending from rear to front axle-box, and provided at mid-length with the index D, with the scale F, springs S, and body A, as set forth.

2. The combination, with a car-body provided with the scales F and F' and bearing the lever-index H, pivoted at $h$ and moving over the scale F', of a rigidly-supported index, D, moving over the scale F and acting upon the rear end of the index H, substantially as set forth.

This specification signed by me this 14th day of September, 1880.

FRIEDRICH WILHELM MINCK.

Witnesses:
LEO SE RELES,
MATHIAS ROWSKY.